Oct. 18, 1938.  E. F. ROSSMAN ET AL  2,133,773
STABILIZER
Filed July 28, 1934
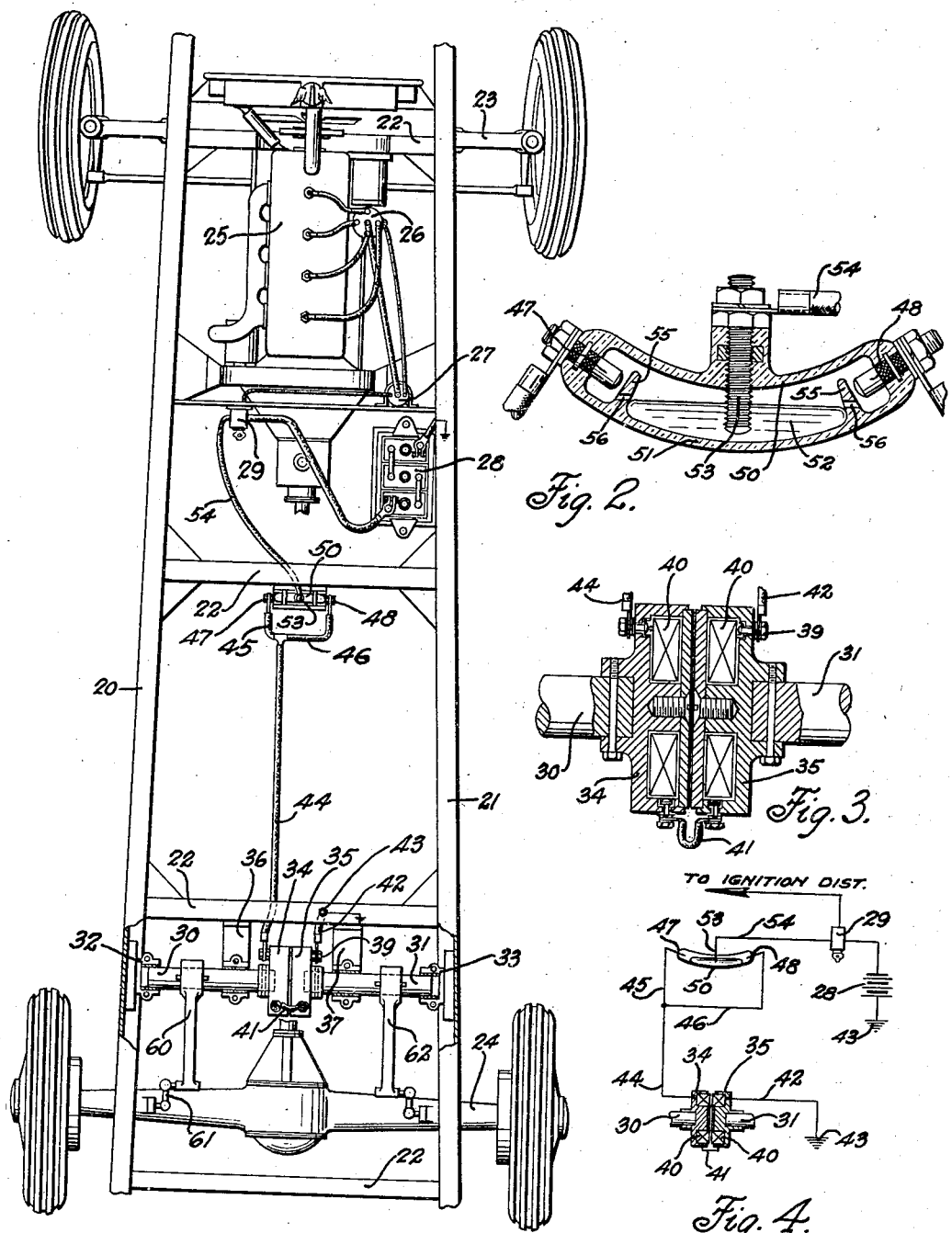
INVENTORS
EDWIN F. ROSSMAN - WILLIAM A. CHRYST
AND RALPH I. BATES
BY
Spencer, Hardman and John
ATTORNEYS Patented Oct. 18, 1938

2,133,773

UNITED STATES PATENT OFFICE 2,133,773

STABILIZER

Edwin F. Rossman, William A. Chryst, and Ralph I. Bates, Dayton, Ohio, assignors to General Motors Corporation, Detroit, Mich., a corporation of Delaware Application July 28, 1934, Serial No. 737,378

5 Claims. (Cl. 267—11)

This invention relates to improvements in stabilizers for motor vehicles.

It is among the objects of the present invention to provide the chassis of a motor vehicle with a stabilizing device which is adapted to eliminate the rolling effect of a vehicle when rounding a curve.

A further object of the present invention is to provide a vehicle with a stabilizer to prevent rolling effects of the vehicle, said stabilizer being automatically controlled so that during ordinary operation of the vehicle, that is, while it is being operated over a comparatively straight road, the stabilizer will be ineffective, thus permitting the shock absorbing elements on the vehicle to properly perform their function, this stabilizer, however, being brought into effect automatically during the operation of the vehicle around a curve so as to substantially eliminate tilting or rolling of the vehicle.

Further objects and advantages of the present invention will be apparent from the following description, reference being had to the attached drawing, wherein a preferred embodiment of the present invention is clearly shown.

In the drawing:

Fig. 1 is a plan view of a vehicle chassis equipped with the present invention.

Fig. 2 is an enlarged sectional view showing the switch for controlling the stabilizer.

Fig. 3 is a detail sectional view showing the electromagnetic clutch which forms a part of the stabilizer.

Fig. 4 is a diagrammatic view showing the electrical connections of the device.

Referring to the drawing, the vehicle is shown provided with a frame having side members 20 and 21 which are tied together by a series of cross members 22. This frame is resiliently supported upon the vehicle axles, the front axle being designated by the numeral 23, the rear axle by the numeral 24. The springs which resiliently support the frame on the axles are not shown in the drawing.

The numeral 25 designates the engine of the vehicle which has an ignition distributor 26 driven thereby to distribute the sparking impulses to the engine. This distributor is electrically connected with an induction coil 27 which is connected to the source of electrical energy or storage battery 28 by the actuation of the ignition switch 29.

Two aligned shafts 30 and 31 are provided between the side members 20 and 21 of the vehicle frame, one end of shaft 30 being rotatably supported in a bracket 32 attached to the frame member 20, while a similar end of shaft 31 is rotatably supported in the bracket 33 attached to the frame member 21. These shafts are in alignment as shown in Fig. 1, their inner ends lying in close proximity to each other and having attached thereto members 34 and 35 forming parts of a clutch which normally is disconnected, thus permitting relative rotation between shafts 30 and 31, but which may be actuated or controlled to become engaged whereby relative rotation between shafts 30 and 31 is substantially prevented. Brackets 36 and 37 are attached to cross member 22 and rotatably support shafts 30 and 31 respectively.

In the present instance the clutch is shown as an electromagnetic clutch, the members 34 and 35 anchored respectively to the adjacent ends of shafts 30 and 31 being alike. Each clutch member has an electromagnet winding 40, adapted to be energized so that the electromagnetic clutch members are attracted to each other to form a bond between shafts 30 and 31. These electromagnet windings of members 34 and 35 are electrically connected by the bridging member 41. The clutch member 35 has a terminal post 39 to which one end of the electromagnet winding of said member is connected. A wire 42 connects the terminal post 39 to a common ground as at 43. The one end of the electromagnet winding of member 34 has terminal wire 44 connected thereto, which terminal wire has two branch portions 45 and 46, one being connected to the terminal posts 47 of the clutch control switch 50, while the other branch portion 46 is connected to the terminal posts 48 of said switch.

As shown in Fig. 1, the switch 50 is mounted substantially centrally of the car, being shown attached to a cross member 22 of the vehicle frame. This switch comprises a hollow body 51, of any suitable insulating material which a fluid conductor 52 such as mercury is housed. The central terminal 53 of the switch, which is connected by wire 54 to the ignition switch 29 as shown in Fig. 1, at all times dips into and is engaged by the fluid conductor 52. Normally, that is, when the vehicle is in its normal horizontal plane, mercury 52 will not contact with either one of terminal posts 47 or 48, the baffles 55 of the switch normally preventing a splash contact between the mercury and these posts during the normal operation of the vehicle and while running over a rough road. However, each of these baffles has an opening 56 through which the mercury may run to contact either post 47 or 48 when the vehicle frame is inclined out of its normal horizontal plane. Such inclination results particularly when the vehicle is rounding a curve and the rolling effect will tend to lift one side of the vehicle relatively to the other.

Referring to Fig. 1, it may be seen that an arm 60 has one end rigidly anchored to shaft 30, the other end being secured to the axle 24 as at 61. Any suitable connection may be provided between the arm 60 and the axle, in this instance applicants have provided standard rubber joints which will yield a certain degree to compensate for side swinging of the frame relative to the axle. Another arm 62 similarly connects the shaft 31 with the axle 24. It may be seen in Fig. 1 that shaft 30 is connected to the axle 24 adjacent its one end while shaft 31 is connected adjacent the opposite end of said axle.

The normally disengaged clutch, as has been mentioned before, permits relative rotation between shafts 30 and 31 and thus, while the vehicle is being operated in a substantially level plane transversely as regards the vehicle, the axle 24 may move upwardly and downwardly in response to striking obstructions in the roadway without any resistance being offered by shafts 30 and 31 for, if the right end of the axle 24 as regards Fig. 1, moves upwardly, shaft 31 may be rotated while shaft 30 is not rotated at all and, on the other hand, if the opposite end of the axle should drop into a rut, shaft 30 might be rotated without causing any rotation of shaft 31. However, if the vehicle is being operated around a curve and particularly at high speed, the tendency is for one side of the vehicle to lift relative to the other, which lift is termed "rolling of the vehicle". Centrifugal force, as the vehicle rounds the curve, will throw the mercury or fluid conductor 52 to one side or the other of switch 50 whereby contact will be made between terminal posts 47 or 48 and the common terminal 53 so that the battery 28 is connected with the electromagnetic clutch and it is energized. The energization of the clutch will cause the clutch members to attract each other and thus provide a bond between shafts 30 and 31, rendering them substantially non-rotatable relatively to each other and thus the lifting action of one end of the axle, or the lifting action of one side of the frame will be transmitted to the opposite side of the axle or frame due to the substantially rigid connection of shafts 30 and 31 supported between the two side members of the frame. As soon as the vehicle assumes a level position again, transversely of the frame, the switch 50 will disconnect the battery from the clutch to render its members relatively rotatable.

In the present instance applicants have combined this automatically controlled stabilizer with the ignition system so that the stabilizer is rendered effective only when the ignition system is connected with the storage battery for the purpose of operating the vehicle. This is done in order to avoid the possibility of depleting the storage battery, which might occur if the vehicle were parked so that its frame would tilt sufficiently to cause a contact between post 53 and either one of the posts 47 or 48. By connecting the stabilizer control to the ignition switch and controlling it thereby, it may easily be seen that such depletion of the battery will be practically eliminated, for the stabilizer is rendered effective only when the vehicle is ready for actual operation, that is, when the ignition switch is closed to render the ignition system of the vehicle effective.

While the embodiment of the present invention as herein disclosed, constitutes a preferred form, it is to be understood that other forms might be adopted, all coming within the scope of the claims which follow.

We claim:

1. A stabilizer for a vehicle having a frame including side members resiliently supported upon the axles of the vehicle; two relatively rotatable shafts; means for supporting said shafts in alinement between the frame side members each shaft being rotatably anchored to a respective side member; an arm connecting each shaft to a common vehicle axle so that upward or downward movement of one end of said axle relatively to the other will cause relative rotation between said shafts; an electromagnetic clutch comprising two members, one normally free of the other, each member being anchored to a respective shaft; a source of electrical energy; and a switch adapted to connect said electromagnetic clutch members to the source of energy and cause them to become energized and held together by magnetic attraction in response to the inclination of the frame transversely out of its normal horizontal plane.

2. A stabilizer for a motor vehicle having an ignition system, a battery and a frame including side members resiliently supported upon the axles of the vehicle, comprising in combination, two alined relatively rotatable shafts supported by the frame each shaft being rotatably secured to a side member of the frame; a clutch member comprising two normally disconnected members each one of which is secured to the end of one of said shafts; arms connecting one vehicle axle to said shafts respectively; a switch for connecting the ignition system to the battery to permit operation of the vehicle; and means for causing the clutch members to engage and render their respective shafts incapable of rotation relatively to each other when the vehicle frame is inclined transversely of its normal horizontal plane and only when said switch has been operated to connect the ignition system with the battery.

3. A stabilizer for a motor vehicle having an ignition system, a battery and a frame including side members resiliently supported upon the axles of the vehicle, comprising in combination, two alined relatively rotatable shafts supported by the frame each shaft being rotatably secured to a side member of the frame; an electromagnetic clutch comprising two normally relatively movable members each one of which is anchored to a respective shaft; levers connecting one vehicle axle to both shafts; a switch for connecting the ignition system with the battery; and a second switch rendered effective by the tilting of the vehicle frame transversely out of its normal horizontal plane only when the first mentioned switch is operated to connect the ignition system with the battery, for connecting the battery with the electromagnetic clutch members to energize them for rendering the two shafts non-rotatable relatively to each other.

4. A stabilizer for a vehicle having a frame including side members resiliently supported from an axle of the vehicle; two relatively rotatable shafts arranged in alignment with one another, and the outer ends of which are rotatably supported by said frame members; means connecting said shafts to said axle so that upward or downward movement of one end of said axle relative to the other end will cause relative rotation between said shafts; two separate and independent clutch members normally disconnected from one another, and which members are secured one to the inner end of each of said shafts; electromagnetic means for causing said clutch members to engage one another and secure said shafts together to thereby prevent relative rotation between them as the frame of the vehicle is tilted transversely out of its horizontal plane; and switch mechanism the operation of which is dependent upon tilting of said frame out of its horizontal plane for closing a circuit in which said electromagnetic means is included.

5. A stabilizer for a vehicle having a frame including side members resiliently supported from an axle of the vehicle; two relatively rotatable shafts arranged in alignment with one another, and the outer ends of which are rotatably supported by said frame members; means connecting said shafts to said axle so that upward or downward movement of one end of said axle relative to the other end will cause relative rotation between said shafts; two separate and independent clutch members normally disconnected from one another, and which members are secured one to the inner end of each of said shafts; and means for causing said clutch members to engage with one another to thereby secure said shafts together and prevent relative rotation between them as the frame of the vehicle is tilted transversely out of its horizontal plane.

EDWIN F. ROSSMAN.
WILLIAM A. CHRYST.
RALPH I. BATES.